United States Patent
Barbee

(10) Patent No.: US 12,109,726 B2
(45) Date of Patent: Oct. 8, 2024

(54) METHOD AND APPARATUS FOR MAKING CONSTRUCTION BLOCKS

(71) Applicant: Texas Australia Rock Company LLC, San Angelo, TX (US)

(72) Inventor: Brian Michael Barbee, San Angelo, TX (US)

(73) Assignee: Texas Australia Rock Company LLC, San Angelo, TX (US)

( * ) Notice: Subject to any disclaimer, the term of this patent is extended or adjusted under 35 U.S.C. 154(b) by 0 days.

(21) Appl. No.: 17/694,371

(22) Filed: Mar. 14, 2022

(65) Prior Publication Data

US 2022/0194851 A1    Jun. 23, 2022

Related U.S. Application Data

(63) Continuation-in-part of application No. 17/388,501, filed on Jul. 29, 2021.

(60) Provisional application No. 63/129,028, filed on Dec. 22, 2020.

(51) Int. Cl.
| | |
|---|---|
| *C04B 14/28* | (2006.01) |
| *B28B 3/04* | (2006.01) |
| *B28B 13/02* | (2006.01) |
| *B28B 15/00* | (2006.01) |
| *C04B 28/02* | (2006.01) |
| *C04B 103/30* | (2006.01) |

(52) U.S. Cl.
CPC .............. *B28B 15/002* (2013.01); *B28B 3/04* (2013.01); *B28B 13/023* (2013.01); *C04B 14/28* (2013.01); *C04B 28/02* (2013.01); *C04B 2103/30* (2013.01)

(58) Field of Classification Search
CPC ..... C04B 14/28; C04B 28/02; C04B 2103/30; B28B 3/04; B28B 15/002; B28B 1/087; B28B 3/02; B28B 3/021; B28B 3/022; B28B 13/02; B28B 13/0205; B28B 13/0215; B28B 13/023; B28B 13/0235; B28B 13/025; B28B 13/026; B28B 13/067; B28B 15/007
See application file for complete search history.

(56) References Cited

U.S. PATENT DOCUMENTS

| | | | |
|---|---|---|---|
| 2,402,367 A | 6/1946 | Cantrall et al. | |
| 2,787,040 A | 4/1957 | Morelli et al. | |
| 4,207,041 A * | 6/1980 | Kampiziones | ........ B28B 15/002 425/62 |
| 4,224,076 A | 9/1980 | Moitra et al. | |
| 4,259,282 A * | 3/1981 | Goldsmith | ............ B28B 15/002 425/316 |
| 4,266,916 A * | 5/1981 | Lubavs | ................ B28B 15/002 425/88 |
| 4,579,706 A | 4/1986 | Elkins | |
| 6,224,359 B1 | 5/2001 | Domazet | |
| 10,377,669 B2 * | 8/2019 | Byrd | ........................ C04B 28/04 |
| 10,494,298 B1 * | 12/2019 | Guynn | ..................... C04B 7/147 |
| 10,662,121 B1 * | 5/2020 | D'Avela | ................ B28C 5/0806 |
| 2002/0105107 A1 | 8/2002 | Everett | |
| 2004/0091317 A1 * | 5/2004 | Shouldice | ............... B28B 7/342 404/72 |
| 2005/0247002 A1 * | 11/2005 | Williams | ................ C04B 28/04 52/596 |
| 2010/0147195 A1 * | 6/2010 | Walloch | .............. C04B 40/0039 106/806 |
| 2012/0230147 A1 * | 9/2012 | Heller | .................... B28C 7/0422 366/141 |
| 2015/0232381 A1 * | 8/2015 | Niven | ..................... C04B 28/04 106/709 |
| 2022/0194851 A1 | 6/2022 | Barbee | |

FOREIGN PATENT DOCUMENTS

| | | | | |
|---|---|---|---|---|
| CN | 106892637 A | * | 6/2017 | |
| FR | 2584707 | * | 1/1987 | |
| GB | 2249988 | * | 5/1992 | |
| GB | 2249988 A | * | 5/1992 | ........... B28B 13/023 |

OTHER PUBLICATIONS

Russtech, Inc.:ES-200: Plasticizing Admixture for Masonry and Pipe Cast Concrete Mixes with Extra Swipe; (2019); Retrieved from the Internet: https://www.russtechnet.com/uploads/tds/ES-2000.pdf (Year: 2019).
A Plus Limestone & Earthmoving posts, 2017.
Coote Finlay—Block Making Equipment website: https://cootefinlay.com/.
F44 | Block Making Machine | Coote Finlay, website: https://cootefinlay.com/products/block-making-quipment/f44-block-making-machine/.
Facebook posts by Stoneridge Quarries, 2013-2014.
Facebook posts of MGM Group, 2016-2017.
Limestone business sets up shop in San Angelo, Aug. 21, 2020, https://www.gosanangelo.com/story/news/2020/08/20/texas-australia-rock-company-builds-limestone-blocks-san-angelo/5605726002/.

(Continued)

*Primary Examiner* — Jeffrey M Wollschlager
(74) *Attorney, Agent, or Firm* — Outlier Patent Attorneys, PLLC

(57) ABSTRACT

A method for making reconstituted limestone blocks includes using a batching plant to make a mixture comprising crushed limestone and cement. The mixture may additionally include water and an additive, such as a plasticizer. The batching plant has been modified to be compatible with the mixture. Next, the mixture is transferred from the batching plant to a mobile stamping machine having a mold box, a hopper, and a feed apparatus configured for transferring the mixture from the hopper to the mold box. Finally, the mobile stamping machine is activated so that the mobile stamping machine forms a construction block by transferring the mixture from the hopper to the mold box, depositing the construction block out of the mold box, and then moving to a next location. The mobile stamping machine is configured to produce approximately 100 construction blocks per hour.

5 Claims, 3 Drawing Sheets

(56) References Cited

OTHER PUBLICATIONS

McGirr Engineering Ltd website: https://mcgirrengineering.com/.
Meteor Stone posts, 2017-2020.
Multilevel Masterblock MKII—McGirr Engineering Ltd, website: https://mcgirrengineering.com/products/multilevel-masterblock-mkii.
Murphy's Limestone webpage screenshots.
Stoneridge Quarries WA; https://stoneridge.net.au/products/standard-products/reconstituted-limestone-blocks/.
Terraforce Supplier, website: https://www.terraforce.com/suppliers-installers/australia/geraldton-block-makers/.
Texas-Australia Rock Company website: https://texausrock.com/about.
Sika, "Sika Concrete Solutions for Concrete Workability," Retrieved from the internet on Aug. 19, 2024, https://usa.sika.com/en/construction/shotcrete—tunneling—mining/concrete-solutions.html#:~:text=SikaC2%AE%20Plastiment%C2%AE%20XR&text=Provides%20sufficient%20time&20for%20placement,provides%20a%20superior%20surface%20finish, May 2, 2016, pp. 1-8.

* cited by examiner

METHOD AND APPARATUS FOR MAKING CONSTRUCTION BLOCKS

CROSS-REFERENCE TO RELATED APPLICATIONS

This application is a continuation-in-part of U.S. patent application Ser. No. 17/388,501, filed on Jul. 29, 2021, which claims the benefit of U.S. Provisional Application No. 63/129,028, filed on Dec. 22, 2020. The contents of both of these applications are hereby incorporated herein by reference.

BACKGROUND

Field of the Art

This invention relates to construction, and more particularly to construction blocks having a desired composition and a method of manufacturing the construction blocks using a mobile stamping machine.

Discussion of the State of the Art

Block stamping methods of the prior art typically utilize a mixture of concrete to form a construction block such as a cinder block, or the like. A block stamping machine is typically utilized with a conveyor arrangement such that stamped blocks produced by the block stamping machine are conveyed away from the block stamping machine to be stacked and stored, and later transported to a job site. Such prior art methods, however, require a conveyor mechanism that is sufficiently large enough so that recently formed blocks have time to cure enough to hold their shape before being removed from the conveyor mechanism. Another disadvantage with these block stamping machines is that the conveyor mechanism has a weight limit, so that size of the blocks that can be produced is limited.

Mobile block producing machines have been used to make concrete blocks, which eliminates the problems with conveyor mechanisms. However, these mobile block producing machines cannot effectively be used to make limestone blocks. It has been found that the composition used to make reconstituted limestone blocks is not compatible with the mobile block producing machines. Limestone mixture is dry compared to concrete mixture, which is wet and thus flows more easily. As such, the mixture used to form reconstituted limestone blocks is too dry and would clog up the mobile block producing machine. For at least these reasons, the mobile block producing machine cannot be used to produce a large number of limestone blocks.

Similarly, batching plants used to make concrete mixtures cannot be used to make limestone mixtures. Batching plants, or concrete plants, include many different parts and accessories that work together to make concrete. For example, a batching plant may include mixers, cement batchers, aggregate batchers, conveyors, bins, heaters, chillers, cement silos, etc. There are many different types, styles, and designs of batching plants. However, all batching plants are designed to produce concrete mixtures and cannot be used to make limestone mixtures due to the consistency and stickiness of the limestone mixture.

Limestone blocks are preferable to concrete blocks for several reasons. First, limestone does not deteriorate with age like concrete does. Further, limestone is more aesthetically appealing than concrete. Limestone retains its structure and color over time better than concrete. Still further, limestone is more affordable than concrete. Both the cost of manufacturing and the cost of maintenance are lower with limestone blocks than with concrete blocks.

Therefore, there is a need for a device and method for forming limestone construction blocks that does not require extensive conveyor means. The needed invention would provide for forming the construction blocks on a surface without the need to move the construction blocks until they have had time to fully cure. Such a needed invention would allow blocks to be made with crushed limestone and cement, providing an inexpensive yet strong construction block. The present invention accomplishes these objectives.

SUMMARY

The present invention relates to a block making apparatus for making construction blocks on a flat surface, such as a concrete slab or other flat ground surface. The block making apparatus has at least a mold box having an open top side, an open bottom side, and one or more compartments each defined by three or more side walls. The block making apparatus further includes a hopper, a feed apparatus to transfer a mixture from the hopper to the mold box through the open top side of the mold box, and a compression apparatus adapted to compress the mixture through the open top side of the mold box and against the surface.

The method of making the construction blocks of the present invention includes the steps of providing the block making apparatus, and mixing crushed, reconstituted limestone with cement and adding a relatively small amount of water. The mixture is delivered into the hopper of the block making apparatus. The mold box is lowered to the ground surface at a next desired position on the surface and the feed apparatus introduces the mixture from the hopper to the mold box, the mixture pouring into the compartments of the mold box through the open top side of the mold box.

When the mixture has completely filled each of the compartments of the mold box, the feed apparatus is withdrawn back under the hopper to collect more of the mixture. Meanwhile, the compression apparatus then compresses the mixture within the mold box to make one or more of the construction blocks. The construction blocks are compressed between the compression apparatus and the surface.

In some embodiments a vibrating apparatus vibrates the mold box to facilitate release of the one or more construction blocks from the mold box. In some embodiments at least some of the side walls of the mold box are slightly tapered from top to bottom, such that the construction blocks are free to exit the open bottom side of the mold box.

The mold box is then lifted above the surface so as to clear the at least one construction block just formed, the weight of the construction block and the vibration of the vibration apparatus being sufficient to release the at least one construction block from the mold box. The block making apparatus is then moved to the next desired location on the surface, leaving the at least one just formed construction block on the surface, clear of the block making apparatus, to cure over the next 18 to 48 hours, the cement acting as a binder and curing the at least one construction block until it is rigid and dry, having a compressive strength of between 800 psi and 1,200 psi.

The block making apparatus is moved to the next desired location on the surface by towing with a tractor, or preferably includes its own drive mechanism as is known in the art. As such, the construction blocks can be manufactured in a relatively high density within an area of the ground surface, without the need for a conveyor or the like for moving the just formed construction blocks out and away from a stationary block making machine of the prior art.

In one embodiment, the present invention is a method for making reconstituted limestone blocks. The method includes using a batching plant to make a mixture comprising crushed limestone and cement. The batching plant has been modified to be compatible with the mixture. Making the mixture may include mixing crushed limestone, cement, water, and an additive. The additive may be a plasticizer. The crushed limestone in the mixture may have a size of ½ inch or less, or ½ inch minus. The crushed limestone may comprise 80%-93% of the mixture. A ratio of the additive to the cement may be approximately 8-12 ounces of the additive per 100 pounds of cement.

The method further includes transferring the mixture from the batching plant to a mobile stamping machine having a mold box, a hopper, and a feed apparatus configured for transferring the mixture from the hopper to the mold box. Still further, the method includes activating the mobile stamping machine so that the mobile stamping machine forms a construction block by transferring the mixture from the hopper to the mold box, depositing the construction block out of the mold box, and then moving to a next location. The mobile stamping machine is configured to produce approximately 100 construction blocks per hour. The construction blocks formed by the mobile stamping machine may have a weight in the range of 200 to 1200 pounds.

In another embodiment, the present invention is a mixture for forming reconstituted limestone construction blocks. The mixture includes crushed limestone, cement, an additive, and water. The additive may be a plasticizer. The crushed limestone may comprise 80%-93% of the mixture. The crushed limestone may have a size of ½ inch or less, or ½ inch minus. A ratio of the additive to the cement may be approximately 8-12 ounces of additive per 100 pounds of cement.

The present invention is a device and method for forming construction blocks that does not require extensive conveyor means. The present invention provides for forming the construction blocks on a surface without the need to move the construction blocks until they have had time to fully cure. The present device and method allows blocks to be made with crushed, reconstituted limestone and cement, providing an inexpensive yet strong construction block. Other features and advantages of the present invention will become apparent from the following more detailed description, taken in conjunction with the accompanying drawings, which illustrate, by way of example, the principles of the invention.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
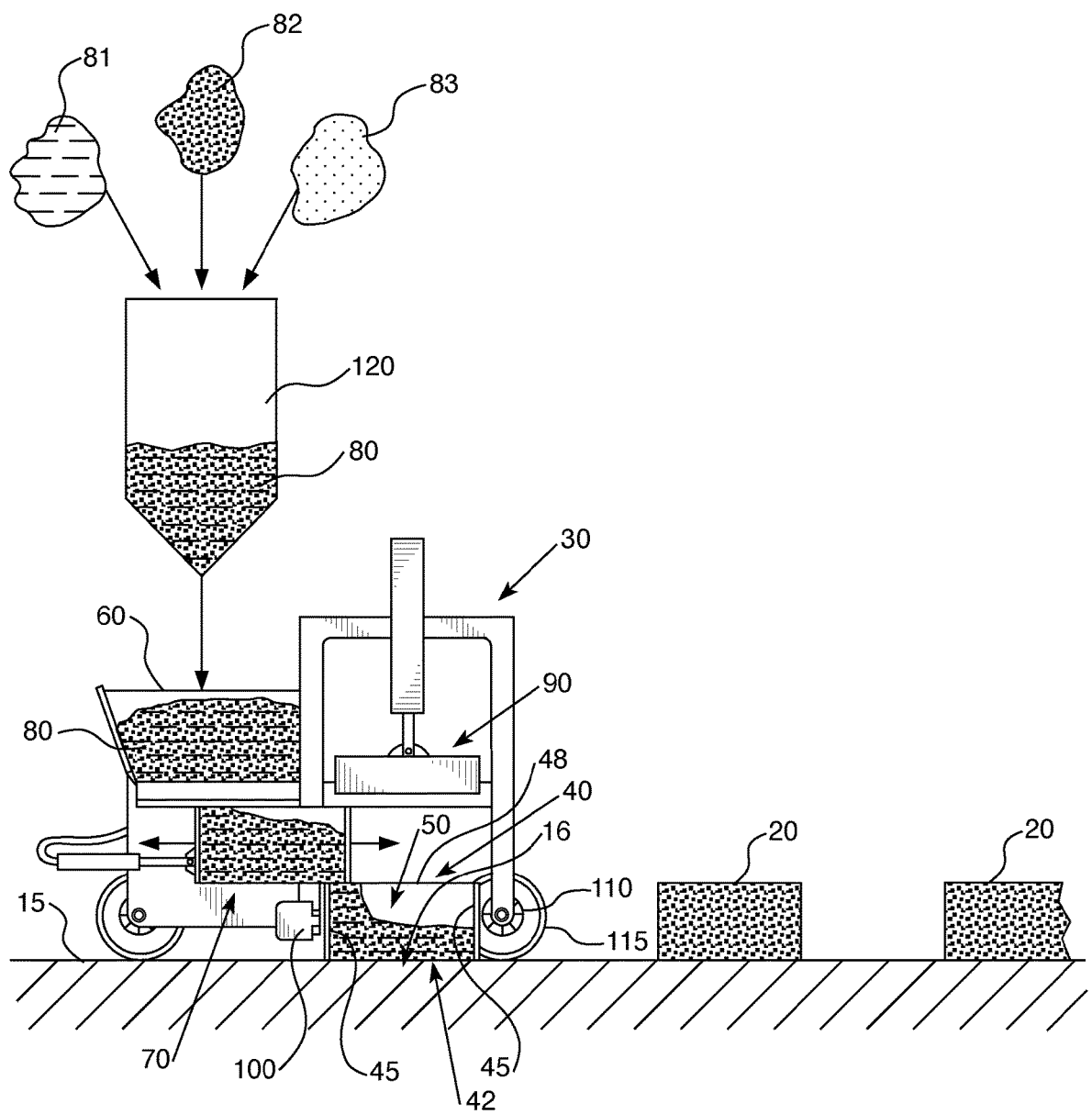
FIG. 1 is a side diagram of a block making apparatus on a surface, in accordance with an embodiment of the present invention.

The present invention is a device and method for making construction blocks. The blocks are made with a mobile stamping machine and a proprietary blend that includes limestone. The limestone blend won't clog the machine, or otherwise reduce the efficiency of the machine. The method for making the blocks includes using a batching plant that has been modified to be compatible with the proprietary limestone mixture. As such, the device and method of the present invention produces construction blocks that are more durable, more economical, and more aesthetically pleasing than concrete construction blocks.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The present invention is a device and method for producing construction blocks made of limestone wherein the blocks are made using a mobile stamping machine. The limestone mixture used to make the blocks includes additives that minimize or prevent the mixture from sticking to the machine. As such, the mobile stamping machine can efficiently produce a large number of blocks in a relatively short amount of time. For example, using the mobile stamping machine and the novel limestone blend, approximately 100 blocks per hour can be produced. In another example, the mobile stamping machine and the novel limestone blend can be used to make approximately 500 to 1,000 construction blocks per day. The construction blocks made with the device and method of the present invention are relatively large. For example, the construction blocks may be approximately 200-1200 pounds each.

Apparatus

Figure 2:
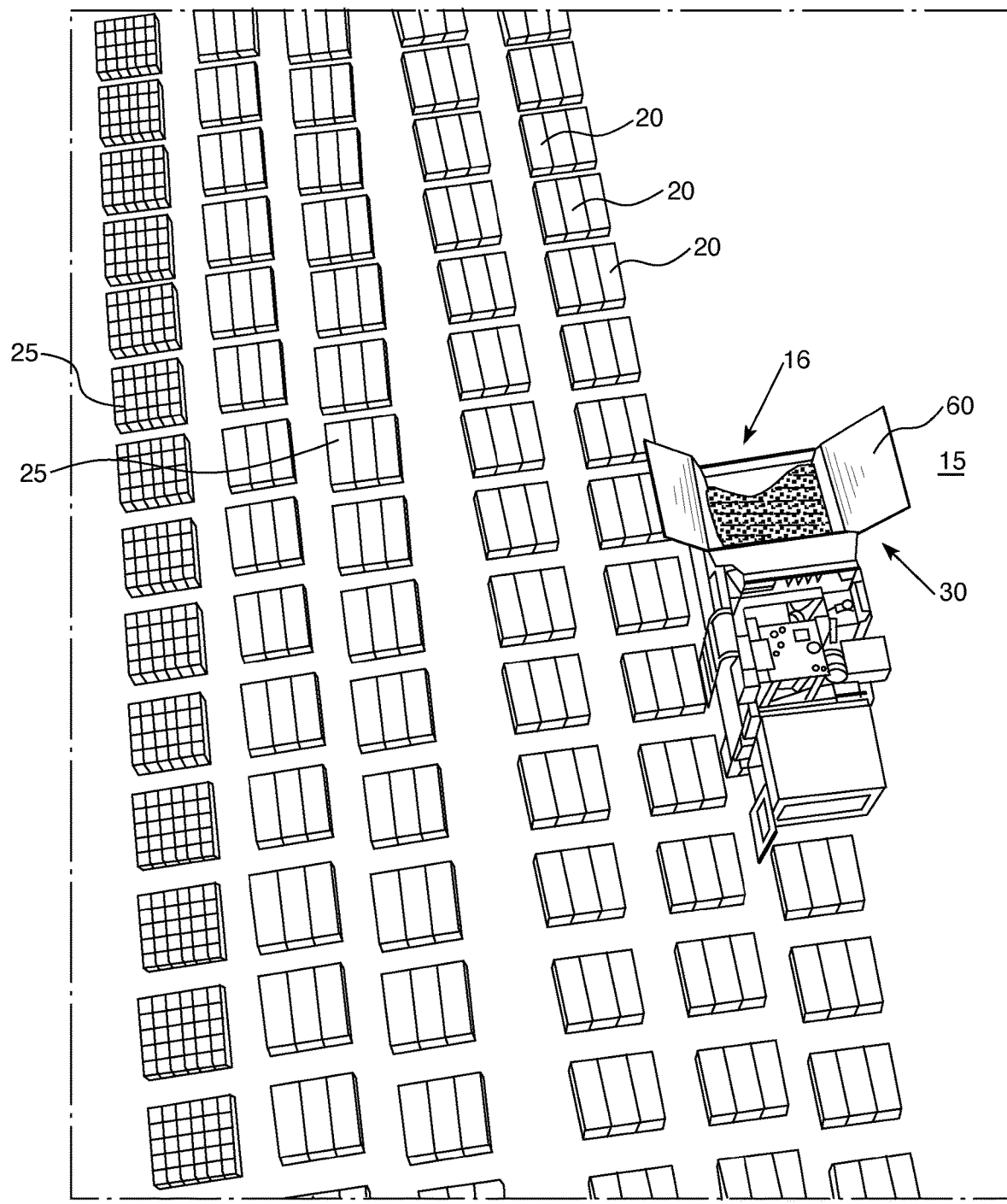
FIG. 2 is a top perspective view of the block making apparatus, in accordance with an embodiment of the present invention.

FIGS. 1 and 2 illustrate a block making apparatus 30 of the present method for making construction blocks 20 on a surface 15, such as a concrete slab, or other flat ground surface. The block making apparatus 30 has at least a mold box 40 having an open top side 48, an open bottom side 42, and one or more compartments 50 each defined by three or more side walls 45. The block making apparatus 30 further includes a hopper 60, a feed apparatus 70 to transfer a mixture 80 from the hopper 60 to the mold box 40 through the open top side 48 of the mold box 40, and a compression apparatus 90 adapted to compress the mixture 80 through the open top side 48 of the mold box 40 and against the surface 15.

The method of making the construction blocks 20 of the present invention includes creating the desired limestone mixture 80 using a batching plant 120 that has been modified to be compatible with the limestone mixture 80. As discussed above, batching plants are typically used for making concrete mixtures and cannot be used for making limestone mixtures because conventional limestone mixtures are too dry and do not flow easily. The present inventors have found that conventional batching plants must be modified to be able to produce a limestone mixture for making reconstituted limestone blocks. In one example, a batching plant was modified to include two gravel chains rather than one sand chain and one gravel chain. Further, the batching plant was modified by changing the gear ratio to slow down the mixing process, which also increased the torque. The modified batching plant 120 can be used to make a limestone mixture 80 for making reconstituted limestone blocks 20.

The components used in making the limestone mixture 80 are added to the modified batching plant 120. In particular, crushed limestone 81, cement 82 and a relatively small amount of water 83 are combined together in the modified batching plant 120. The limestone 81 is crushed to a size of ½ inch minus, that is, with a maximum piece size of about ½ inch in diameter. The ratio of crushed limestone 81 is between 80%-93%, with the cement 82 and optional additives making up the difference. The water 83 is added to this mix of limestone 81 and cement 82 to make the relatively dry mixture 80 having a consistency of damp sand such that when compressed into the construction block 20 the construction block 20 can hold its shape on the surface 15 against gravity. One preferred additive is a plasticizer, such as that made by Riteks of Houston, Tex., under the product name ES-2000, preferably at a ratio of 8-12 ounces per 100 pounds of cement. The combination of the limestone, cement, water, and plasticizer has been found to produce strong, durable blocks and won't clog the mobile stamping machine 30.

After the mixture 80 is created in the modified batching plant 120, the mixture 80 is transferred to the mobile block making apparatus 30. The mixture 80 is delivered, typically by truck and loader or other means, into the hopper 60 of the block making apparatus 30. The mold box 40 is lowered to the ground surface 15 at a next desired position 16 thereon and the feed apparatus 70 introduces the mixture 80 from the hopper 60 to the mold box 40, the mixture 80 pouring into the compartments 50 of the mold box 40 through the open top side 48 of the mold box 40. FIG. 1 illustrates the feed apparatus 70 moving from under the hopper 60 where the mixture is gathered in the feed apparatus 70 to above the mold box 40, where the mixture 80 drops into the open top side 48 of the mold box 40 into each compartment 50.

When the mixture 80 has completely filled each of the compartments 50 of the mold box 40, the feed apparatus 70 is withdrawn back under the hopper 60 to collect more of the mixture 80. Meanwhile, the compression apparatus 90 then compresses the mixture 80 within the mold box 40 to make one or more of the construction blocks 20. The construction blocks 20 are compressed between the compression apparatus 90 and the surface 15.

In some embodiments a vibrating apparatus 100, such as a motor with an off-set weight, or the like, vibrates the mold box 40 to facilitate release of the one or more construction blocks 20 from the mold box 40. In some embodiments at least some of the side walls 45 of the mold box 40 are slightly tapered from top to bottom, such that the construction blocks 20 are free to exit the open bottom side 42 of the mold box 40.

The mold box 40 is then lifted above the surface 15 so as to clear the at least one construction block 20 just formed, the weight of the construction block 20 and the vibration of the vibration apparatus 100 being sufficient to release the at least one construction block 20 from the mold box 40. The mold box 40 is lifted to a raised position (not shown) by hydraulic or pneumatic actuators (not shown), a gear mechanism (not shown), or the like. The block making apparatus 30 is then moved to the next desired location 16 on the surface 15, leaving the at least one just formed construction block 20 on the surface, clear of the block making apparatus 30, to cure over the next 18 to 48 hours, the cement 82 acting as a binder and curing the at least one construction block 20 until it is rigid and dry, having a compressive strength of between 800 psi and 1,200 psi.

The block making apparatus 30 is moved to the next desired location 16 on the surface 15 by towing with a tractor (not shown), or preferably includes its own drive mechanism 110 as is known in the art. The drive mechanism 110 preferably includes wheels 115 that roll between rows 25 of the construction blocks 20 formed with the method of the present invention, and with the mold box 40 in a raised position, are the only portions of the block making apparatus 30 that are lower than a height of the construction blocks 20. As such, the construction blocks 20 can be manufactured in a relatively high density within an area of the ground surface 15, without the need for a conveyer or the like for moving the just formed construction blocks 20 out and away from a stationary block making machine of the prior art. Such a drive mechanism 110 includes one or more motors (not shown) linked with a chain (not shown), drive shaft (not shown) or other means to rotate the wheels. A steering mechanism (not shown) can also be included on at least two of the wheels 115 for steering the block making mechanism 30.

The process described above is repeated until a desired number of construction blocks are produced. For example, the process described above may be repeated to produce approximately 100 blocks per hour and/or approximately 500-1,000 blocks per day. This is an important aspect of the present invention because previous methods of producing reconstituted limestone blocks are not as quick and efficient as the present method. For example, a mobile stamping machine may be used to make reconstituted limestone blocks using a conventional limestone mixture having components and/or ratios that are different from the limestone mixture disclosed herein. However, the conventional limestone mixture may clog the machine, thus slowing down the process of making the blocks. As such, conventional methods and mixtures cannot be used to produce reconstituted limestone blocks at the rate of approximately 100 blocks per hour.

Figure 3:
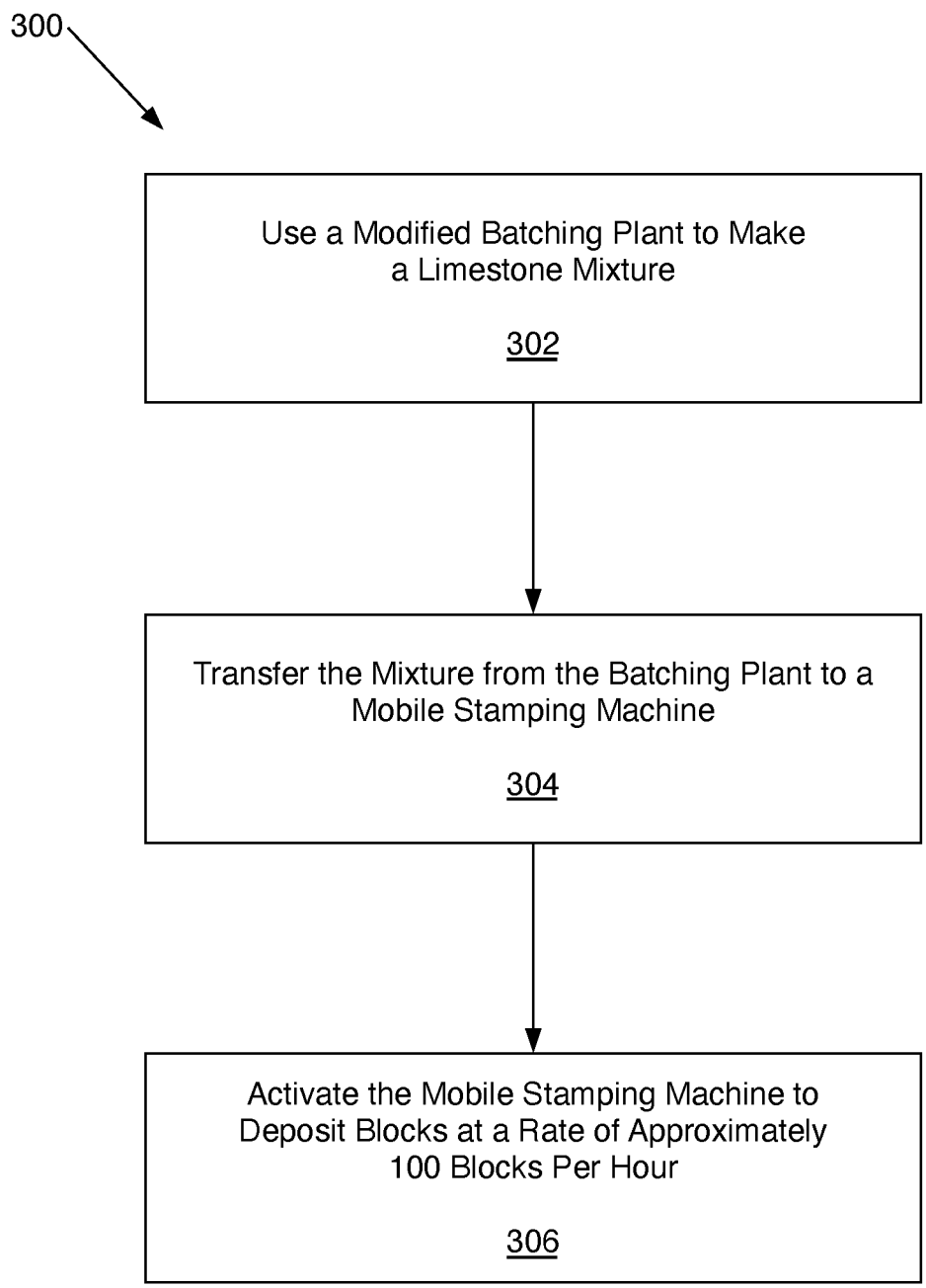
FIG. 3 is a flow chart of a method for making reconstituted limestone blocks, in accordance with an embodiment of the present invention.

FIG. 3 depicts a method 300 for making reconstituted limestone blocks at a rate of approximately 100 blocks per hour. The method 300 includes a step 302 of using a modified batching plant 120 to make a mixture 80 comprising crushed limestone and cement. As discussed in more detail above, the mixture may include crushed limestone, cement, water, and an additive. The additive may be a plasticizer. The composition of the mixture may comprise 80%-93% limestone. The ratio of the additive to the cement may be approximately 8-12 ounces of additive per 100 pounds of cement.

Next, in step 304, the mixture 80 is transferred to a mobile stamping machine 30. As discussed in greater detail herein, the mobile stamping machine 30 includes a mold box 40, a hopper 60, and a feed apparatus 70 configured for transferring the mixture from the hopper 60 to the mold box 40. Finally, in step 306, the mobile stamping machine 30 is activated. Once activated, the mobile stamping machine 30 will transfer the mixture 80 from the hopper 60 to the mold box 40, deposit the construction block 20 out of the mold box 40, and then move to a next location. The mobile stamping machine 30 repeats these steps until a desired number of construction blocks 20 are formed. Due to the unique nature of the mixture 80 used in the method 300, the mobile stamping machine 30 is able to quickly produce a relatively large number of construction blocks 20 in a relatively short amount of time. For example, the mobile stamping machine 30 is able to produce approximately 100 construction blocks per hour and/or 500-1,000 blocks per day. The blocks 20 are larger than limestone blocks produced through conventional methods. For example, the reconstituted limestone blocks 20 are in the range of 200-1200 pounds each.

Additional Considerations

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method for making reconstituted limestone blocks, the method comprising:
    using a batching plant to make a limestone mixture, wherein the batching plant has been modified to be compatible with the limestone mixture, and wherein the batching plant has a volume sufficient for making enough of the limestone mixture to produce reconstituted limestone blocks each having a weight of 200-1200 pounds at a rate of 100 reconstituted limestone blocks per hour;
    transferring the limestone mixture from the batching plant to a mobile stamping machine having a mold box, a hopper, and a feed apparatus configured for transferring the limestone mixture from the hopper to the mold box;
    activating the mobile stamping machine so that the mobile stamping machine forms a reconstituted limestone block by transferring the limestone mixture from the hopper to the mold box, depositing the reconstituted limestone block out of the mold box, and then moving to a next location, wherein the mobile stamping machine is configured to produce reconstituted limestone blocks each having a weight of 200-1200 pounds; and
    generating a plurality of reconstituted limestone blocks using the activated mobile stamping machine at a rate of approximately 100 reconstituted limestone blocks per hour or more,
    wherein making the limestone mixture comprises mixing crushed limestone, cement, water, and a plasticizer, and
    wherein the crushed limestone comprises 80%-93% of the limestone mixture on a dry ingredient basis.

2. The method of claim 1, wherein the crushed limestone in the limestone mixture has a size of ½ inch or less.

3. The method of claim 2, wherein the crushed limestone in the limestone mixture has a size of 1/2 inch minus.

4. The method of claim 1, wherein a ratio of the plasticizer to the cement is 8-12 ounces of the plasticizer per 100 pounds of cement.

5. The method of claim 1, wherein the reconstituted limestone block formed by the mobile stamping machine weighs 400-1200 pounds.

\* \* \* \* \*